United States Patent
Kotiranta (10) Patent No.: US 7,609,268 B2
(45) Date of Patent: Oct. 27, 2009

(54) ARRANGEMENT FOR THE SCALING OF FONTS

(75) Inventor: Atte Kotiranta, Tampere (FI)

(73) Assignee: Nokia Corporation, Espoo (FI)

( * ) Notice: Subject to any disclaimer, the term of this patent is extended or adjusted under 35 U.S.C. 154(b) by 289 days.

(21) Appl. No.: 11/027,028

(22) Filed: Dec. 30, 2004

(65) Prior Publication Data
US 2005/0146528 A1   Jul. 7, 2005

(30) Foreign Application Priority Data
Dec. 31, 2003   (FI)   ................................. 20035250

(51) Int. Cl.
*G06T 11/00*   (2006.01)

(52) U.S. Cl. .................. 345/467; 345/471; 715/256

(58) Field of Classification Search .................. 345/467
See application file for complete search history.

(56) References Cited

U.S. PATENT DOCUMENTS

| | | | |
|---|---|---|---|
| 5,562,350 A * | 10/1996 | Sakurai | 400/61 |
| 5,579,416 A | 11/1996 | Shibuya et al. | 382/293 |
| 5,600,770 A * | 2/1997 | Kawabata et al. | 715/542 |
| 6,310,624 B1 * | 10/2001 | Watanabe | 345/467 |
| 2004/0006749 A1 | 1/2004 | Fux et al. | 715/535 |

* cited by examiner

*Primary Examiner*—Kee M Tung
*Assistant Examiner*—Michelle K Lay (57) ABSTRACT

The invention relates to a method for presenting a character by using a scalable vector font. In the method, for said scalable vector font, at least first and second scalable vector fonts are defined, which are alternatives to each other. For optimizing the readability of the character, one of said at least first and second scalable vector fonts is selected to be used for presenting the character. The invention also relates to an electronic device, a computer software product, and a system.

18 Claims, 6 Drawing Sheets

abcdefg―ㄧㄅㄐㄑㄒㄓㄔ传佯伢仮伤伥偤偺傲偨偺傲偨傑傽

Fig. 3a (Prior Art)

abcdefg―ㄧㄅㄐㄑㄒㄓㄔ传佯伢仮伤伥偤偺偺傲偨偺偺傲偨傑傽

Fig. 3b (Prior Art)

abcdef g―ㄧㄅㄐㄑㄒㄓㄔ传伡师呼现伤伴偺偺偨偺偨偺偨偺偨

ARRANGEMENT FOR THE SCALING OF FONTS

CROSS-REFERENCE TO RELATED APPLICATIONS

This application claims priority under 35 USC §119 to Finnish Patent Application No. 20035250 filed on Dec. 31, 2004.

FIELD OF THE INVENTION

The present invention relates to a method, a device implementing the method, and a system, as well as a computer software product for the scaling of fonts used by an electronic device, in which method a character is presented by using a scalable vector font.

BACKGROUND OF THE INVENTION

A so-called character-based presentation format has been developed for computer systems. Character-based programs and interfaces comprise a display element as an array of small squares, of which squares each can contain one character. In these character-based systems, all the information to be displayed on the display element, such as letters, numbers, spaces, and graphic symbols, are understood as characters.

At present, in graphic-based computer programs, the term 'character' typically denotes letters, numbers and punctuation marks. The graphic-based computer programs process the display element as a pixel matrix which consists of millions of different pixels and which pixel matrix is used to form the characters and other objects by illuminating or colouring certain pixels to constitute a desired pattern on the display element.

Irrespective of the mode of presentation, the characters must be converted to a binary code to have an intelligible meaning for the computer. In many systems, this conversion is implemented by using standardized encoding systems. Like a common language of communication, the standardized character encoding systems make it possible to transfer information and to communicate between computers and other electronic devices of various types.

There are various standardized character encoding systems. Older character-based DOS (Disk Operating System) programs use the so-called ASCII system (American Standard Code for Information Interchange). Programs based on the Windows® operating system by Microsoft use the so-called ANSI system (American National Standards Institute). WWW browsers (World Wide Web), in turn, typically use the so-called ISO Latin 1 system (International Standards Organization), whose official name is ISO-8859-1. The so-called Unicode character system has also been developed, whose official name is ISO-10646 and which attempts to cover all the existing character languages and also to present all the scientific symbols. The Unicode character system is used, for example, in the most recent Windows® operating systems.

Said character systems are known as such, and their more detailed discussion will not be necessary in this context.

Figure 2:
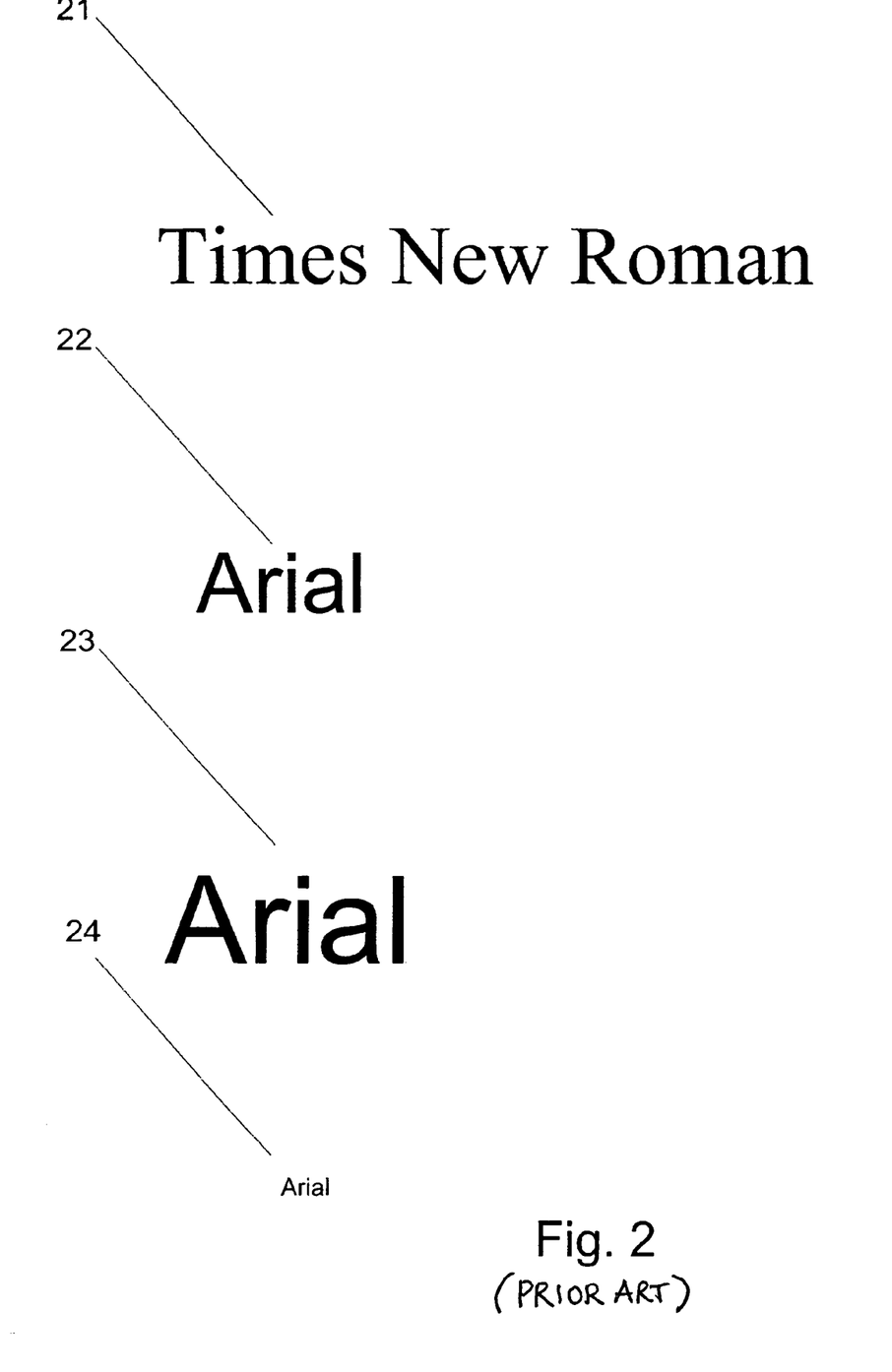
FIG. 2 shows some known font types of different sizes.

Fonts refer to the external format and style for a given set of characters, for example when the characters are output on a display device or by a printer. The font defines, in addition to a given letterface style, the size and the pitch of the characters. For example, "Times New Roman" is a letterface style which defines the form of the characters using said style, but there are different fonts using the "Times New Roman" letterface style, for example in different sizes, in italics, in bold, etc. FIG. 2 shows some examples of common fonts.

Previously, due to the character-based property of computer systems, the selection of fonts has been relatively small. Typically, all the letters and symbols have been represented by simple fonts at a fixed pitch. At present, the graphic-based operating systems and applications make it possible to use a considerably larger selection of fonts. Most graphic-based operating system already include a large selection of fonts, and in addition to this, new fonts can be downloaded to be used by the operating system later on, for example in connection with the installation of a new printer.

Electronic devices, such as, for example, computers, peripheral devices, personal digital assistants (PDA), and mobile phones, typically use two different output formats for fonts: bitmap fonts and vector fonts. When bitmap fonts are used, each character is presented by using a dot matrix, and for example in the printing of a bitmap font, the printer prints out the dots included in the character. Another commonly used term for the bitmap font is the grid font. The logical size of the bitmap font is fixed, and therefore, its physical size (width×height) on the display of the electronic device or in printing depends on the resolution of the device (e.g. pixels per inch). The bitmap fonts are not as efficient as the vector fonts in view of the memory consumption, because the implementation of the bitmap fonts requires that a separate bitmap set is created for each font size in the electronic device. This is problematic particularly in language versions with a large number of characters, such as in a Chinese character set. An advantage of the bitmap fonts is their easy storability in the memory of the device and the retrieval from the memory as well as the representation of the font, because the information included in the fonts is based on bitmaps. A disadvantage of the bitmap fonts is their memory consumption, because there must be a separate font set for each font size.

Another font representation form is the so-called vector font. In vector fonts, the form of each character is geometrically defined by means of mathematical vectors. For example, the form of the character can be defined by means of successive segments in such a way that by means of them, the form of the character can be produced mathematically by adding up the sums of the vectors. In their simplest form, the segments can be straight lines with defined starting and end points. The attributes defining the appearance of the vector font do not include the size; that is, there are no separate definitions for fonts of different sizes. Because of its mathematical nature, the form of the vector font can be easily made in different sizes by scaling the starting and end coordinates of the segments defining the form, and the dimensions of the segments (length, curvature, etc). As a result, it is not necessary to store a separate font set for each font size in the electronic device, as in the case of the bitmap fonts. The vector fonts are also very suitable for electronic devices with a high resolution, where the scalability of the vector fonts does itself justice.

SUMMARY OF THE INVENTION

In the context of the present application, the term vector font also covers the so-called outline font and the stroke font. The outline font is typically formed by various stroke and curvature instructions, and the fonts can be scaled and rotated. In the case of the outline font, after the definition of the outlines, the area left between them is filled up with pixels, to form the final font description. The stroke font, in turn, is formed by various stroke and curvature instructions, but the stroke font is not used to define the outlines of the characters to leave any space to be filled in between the characters. The stroke fonts can be scaled and rotated in the same way as the outline fonts, but thanks to their simpler description, the memory capacity required for the description of the fonts is smaller than for the outline fonts.

The vector fonts also involve problems. When drawing a very small character, it is possible that the character becomes unclear when adjacent lines touch each other. This is a major problem particularly in languages in which the characters are complex and include a large number of strokes close to each other, such as, for example, in the Chinese character set.

A typical solution in the arrangement of prior art has been to include either a bitmap font or hinting data for each problematic character and font size. A rasterizer is a program which receives, as its input, a description of the font and which, on the basis of the description, generates a bitmap description for the output on a display device. The rasterizer is typically a part of the operating system or the printer application of the electronic device. When generating the bitmap description for a given character, the rasterizer takes the following steps:

Reading the outline description for a given character from the memory of the electronic device;
Scaling the outline description to the desired size and to the desired resolution;
Possibly correcting the scaled outline description in such a way that the outline description is as uniform as possible in its outline (i.e., anti-aliasing);
Filling the parts left inside the outline of the character with pixels.

If, in addition to the vector font, an embedded bitmap font for the character to be produced is also found in the memory means of the electronic device, the vector font is typically replaced with the embedded bitmap font. The embedded bitmap font relates to bitmap fonts which have been embedded, in addition to the vector fonts, in the font packet of the electronic device and which are available, if the quality of the vector font generated by the rasterizer is too poor. The problem in this use of embedded bitmap fonts according to the prior art is the same as in the use of mere bitmap fonts, that is, the relative increase in the overall size of the font packet, particularly in font sets with a large number of characters, because each font size must be provided with a separate bitmap.

An electronic device with a limited memory capacity for the different functional blocks of the device involves another problem in the arrangement of the invention. Particularly in small portable electronic devices, such as personal digital assistants and mobile communication devices, the aim is to achieve a compact size, a low power consumption and low manufacturing costs by minimizing the number and size of the components needed for implementing the device. One such component is the memory of the electronic device. On the other hand, the aim is to provide the user of the device with as good an operating environment as possible, with its applications and user interface options for the applications. One such feature is the fonts, the different language versions and the displaying of the characters as clearly as possible on the display of the device.

In arrangements of prior art, a situation may occur, in which the readability of the characters, particularly with small vector fonts and complex character sets, is so poor that the user can no longer read them on the display of the device, and the memory of the device has no space for the storage and use of embedded bitmap fonts in such problem situations.

Now, an improvement to the prior art has been invented, to improve the scaling of the size of fonts supported by the operating systems of electronic devices. By the arrangement now invented, the usability of an electronic device is improved in a situation, in which the font packet supported by the operating system of the electronic device comprises a large number of characters, for which one should be able to generate several different font sizes, if necessary. By the arrangement now invented, embedded vector fonts are used to improve the scaling of the fonts used by the electronic device. The vector font packet used by the electronic device according to the invention comprises at least two vector font descriptions for a single character, which descriptions are optimized for fonts of different sizes. In this way, the use of embedded bitmap fonts is totally avoided. In the optimization of the embedded vector fonts according to the invention, it is essential that those properties of the character which are most important for the intelligibility and the readability are conveyed to the user. Particularly in stroke-based characters, for example Chinese characters, certain strokes, the number or direction of the strokes, are more significant than others, and the aim is to emphasize these in such a way that the significant features of the character are highlighted in each embedded vector font. It is also possible to create a larger number of embedded vector fonts for certain complex characters than for simpler characters and thereby to optimize the memory consumption and the readability of the characters.

The arrangement now invented can be applied in any electronic device and in any application.

According to a first aspect of the invention, a method is implemented for outputting a character by using a scalable vector font, comprising defining, for said scalable vector font, at least first and second scalable vector fonts which are alternatives to each other, and for optimizing the readability of the character, one of said at least first and second scalable vector fonts is selected for use in presenting the character.

According to a second aspect of the invention, an electronic device is implemented, which comprises means for storing a scalable vector font in an electronic device, means for defining the mode of outputting the character by using the scalable vector font, means for defining, for said vector font, at least first and second alternative scalable vector fonts, and also, for optimizing the readabilitiy of the character, means for selecting one vector font of said at least first and second scalable vector fonts, to be used for presenting the character.

According to a third aspect of the invention, a computer software product is implemented, which comprises machine-executable program instructions for generating a character in an electronic device by using a scalable vector font, for presenting the character, for defining, for said scalable vector font, at least first and second scalable vector fonts, as alternatives to each other, and for selecting one vector font of said at least first and second scalable vector fonts to be used for outputting the character and for optimizing the readability of the character.

According to a fourth aspect of the invention, a system is implemented, which comprises a server, at least one electronic device, means for providing a data transmission connection between the electronic device and the server, means for defining a scalable vector font, and means for defining the form of outputting the character by using the scalable vector font, means for defining, for said vector font, at least first and second scalable vector fonts, as alternatives to each other, means for transmitting said first and second alternative scalable vector fonts form the server to the electronic device, and in addition to this, for optimizing the readability of the character, means for selecting one vector font of said at least first and second scalable vector fonts, to be used in the output of the character.

Considerable advantages are achieved by the present invention. When applying the method according to the invention, it is possible to avoid the use of embedded bitmap fonts, and particularly in the use of stroke-based character languages with a large number of characters, it is possible to produce a better and more detailed output format than the vector fonts of prior art on a display device or in a printer. In addition, the memory space required by the font packet in the electronic device is smaller than in the case of embedded bitmap fonts of prior art.

BRIEF DESCRIPTION OF THE DRAWINGS

In the following, the invention will be described in more detail with reference to the appended drawings, in which.

DETAILED DESCRIPTION OF THE INVENTION

Figure 1:
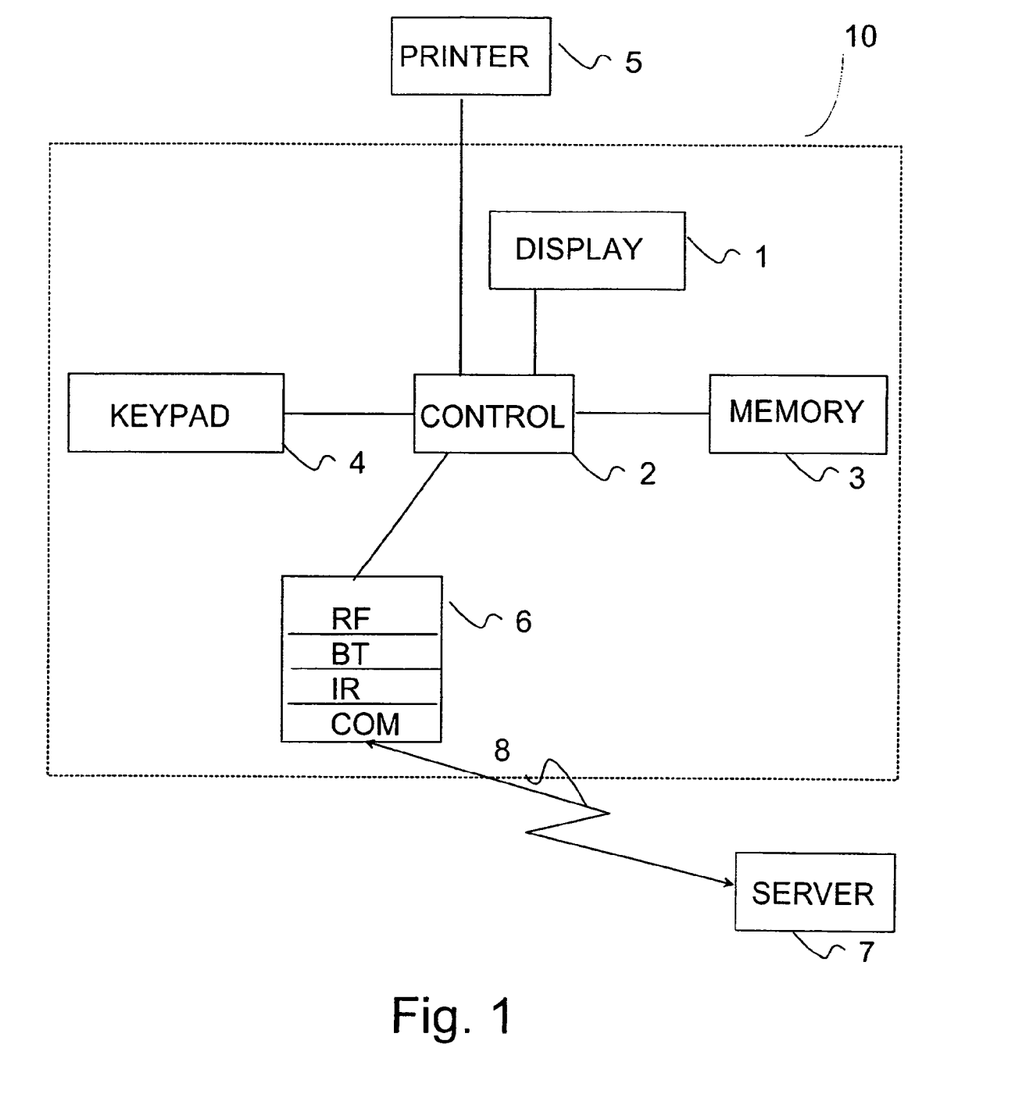
FIG. 1 shows, in a simplified block diagram, an arrangement, in which the invention can be applied.

With reference to FIG. 1, an arrangement, in which the invention can be applied, is shown in a simplified block diagram. The electronic device 10 comprises display means 1, a processor 2 for controlling the functions of the electronic device 10, memory means 3 for the storage of the application software and the data needed during the use of the electronic device 10, input means 4 for inputting data, and data transmission means 6 for setting up a data transmission connection 8 between the electronic device 10 and a server 7. A printer 5 is provided for printing data from the electronic device 10. The vector fonts used by the electronic device 10 are also stored in the memory means 3. The server 7 comprises means for defining and storing the vector fonts, and the server 7 can be any device arranged in a data transmission connection 8 with the electronic device 10. The data transmission connection 6 can be implemented, for example, by using a radio connection RF (for example, a mobile communication network or a wireless local area network), a short-range radio connection BT (for example, Bluetooth®), an infrared connection IR, or a cabled connection COM. Corresponding data transmission means are also provided in the server 7 (not shown in the figure).

With reference to FIG. 2, three known font types are shown. The first one is "Times New Roman" (trademark owned by Monotype Corporation) font 21, which is a so-called "True Type" or vector font. Consequently, the first one is the character string "Times New Roman" output by using a normal vector font of prior art with a first font size. The second one is "Arial" (trademark owned by Monotype Corporation) font 22, which is also a so-called "True Type" or vector font, and the line is thus an output of the character string "Arial" by using a normal vector font of prior art with a second font size. The third one is "Arial" (trademark of Monotype Corporation) font 23, which is also a so-called "True Type" or vector font, and the line is thus an output of the character string "Arial" by using a normal vector font of prior art with a third font size. The fourth one is "Arial" (trademark owned by Monotype Corporation) font 24, which is also a so-called "True Type" or vector font, and the line is thus an output of the character string "Arial" by using a normal vector font of prior art with a fourth font size. As it can be seen from the different font sizes and types, the readability of the characters, irrespective of their size, remains relatively good also in the printed version.

Figure 3A:
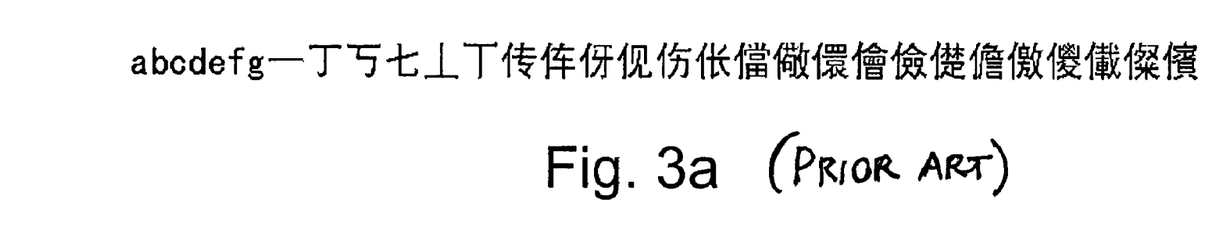
FIG. 3 shows a view of the scaling method of prior art, with different font sizes, on a display device.
Figure 3B:
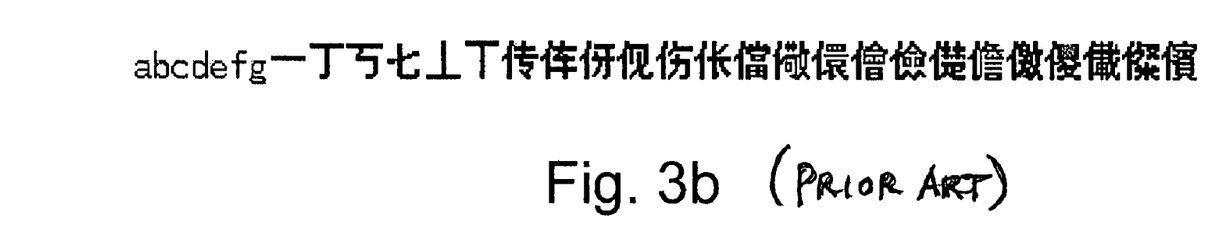
Figure 3C:
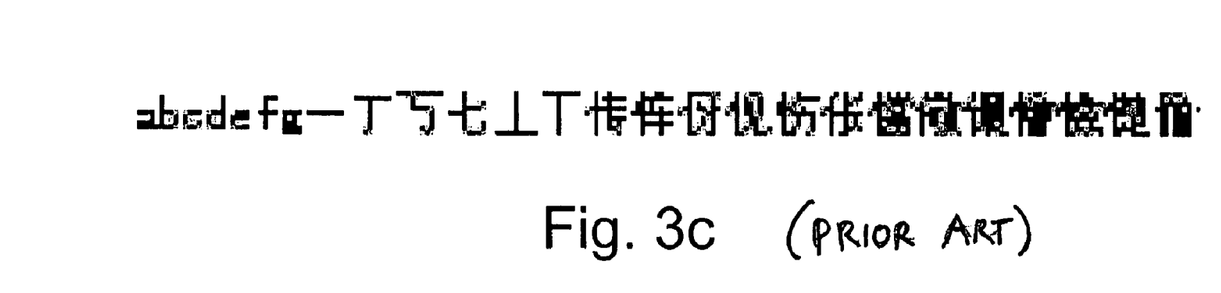

FIG. 3 shows changes in the font size on the basis of scalable vector fonts according to the prior art. FIG. 3a shows characters of a scalable vector font at the height of 30 pixels. Typically, most of the texts displayed on a display device are implemented with Latin letters and numbers which are so-called phonetic characters. In phonetic characters, one symbol primarily represents one phoneme. Other known phonetic character sets include, for example, Cyrillic, Arabic and Hebrew characters. In FIGS. 3a-c, the first seven characters are the above-mentioned Latin letters a to g. In addition to the Latin characters, also other characters are known which are used to express information. For example, in China, word characters are used, in which one character represents one word, and in Japan, so-called syllabic characters are used, which typically represent one syllable. Chinese and Japanese characters are stroke-based characters whose details may be complex, and the number of different characters is multiple when compared with the Latin character set. For example in China, the number of most commonly used word characters is almost 10,000. Furthermore, several word and syllabic characters are more complex than the Latin characters. Thus, the output of the characters by a conventional display or printing device requires a high resolution and a method for arranging the scaling of the characters in such a way that the readability of the characters is maintained, also in small font sizes. In FIG. 3a, after the first seven Latin characters, a to g, 23 different stroke-based characters are shown by using scalable vector fonts of prior art with the height of 30 pixels. In stroke-based characters, particularly in the characters at the end of the line, there are several parallel horizontal and vertical strokes in alignment. In FIG. 3a, the readability of these characters is still relatively good, and all the strokes are still distinguishable.

In FIG. 3b, the characters are shown by using the scalable vector font of prior art with the height of 16 pixels. To illustrate the level of readability of the characters, all the characters have been stretched by 200% after the scaling. In FIG. 3b, the readability of the complex stroke-based characters at the end of the line is affected already, and all the strokes in the characters are no longer clearly distinguishable.

In FIG. 3c, the characters are shown in the scalable vector font of prior art with the height of 10 pixels. To illustrate the level of readability of the characters, all the characters have been stretched by 400% after the scaling. In FIG. 3c, the readability of the complex stroke-based characters at the end of the line is already very poor, and some of the strokes are no longer distinguishable at all.

In the arrangement of prior art, to solve the above-described problem, scalable vector fonts have been used for large font sizes, for example characters with the height of at least 16 pixels, and bitmap fonts have been used for smaller font sizes, for example for characters with the height of fewer than 16 pixels. In this arrangement, however, there must be a separate bitmap font for each font size, which causes that the storage capacity required for the storage of the fonts is significantly increased when compared with the situation of mere scalable vector fonts. Also, the quality of the characters to be displayed is affected, if all the bitmap fonts are not stored in the memory means of the electronic device 10.

Figure 4:
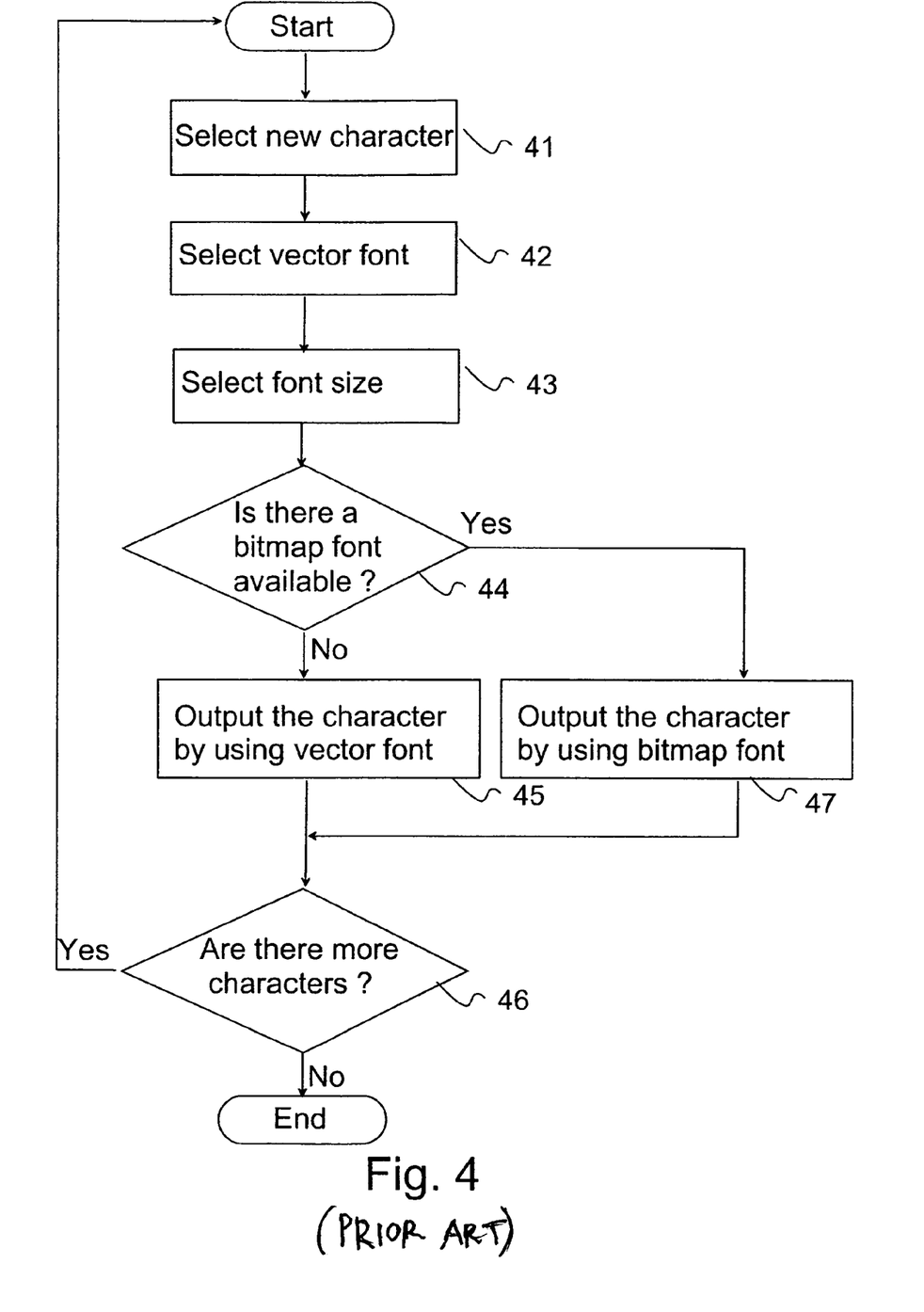
FIG. 4 illustrates the method according to prior art in a simplified flow chart.

FIG. 4 illustrates the method according to prior art in a simplified flow chart. The input of the characters into the display device 1 or the printer 5 for presentation may be based, for example, on characters entered by the user via the keypad 4 of the electronic device 10, or characters generated by software being run in the electronic device 10. As shown in FIG. 4, a text processing application run in the electronic device 10 receives, as an input, a command to generate a new character 41. The new character is identified, for example, on the basis of another character system described above in this application, after which the application selects 42, on the basis of definitions provided by the user or by the application itself, for the character a scalable vector font stored in the memory means 3 of the electronic device 10. After the selection 42 of the vector font, a font size 43 is selected for the character to be presented, and said vector font is scaled to the desired size by a method of prior art. When proceeding further to the control 44 of the bitmap font, the application checks whether a bitmap font with said font size, in addition to the scalable vector font, can be found for said font in the memory means 3 of the electronic device 10. If the bitmap font for said font size is found, the desired character is output by using the bitmap font 47 on the display device 1 or in the printer 5, and the application proceeds to check 46, if there are more characters to be output and, if necessary, it returns to the generating 41 of the next character. If no bitmap font is found, the character is output by the display device 1 or by the printer 5 by using the existing scalable vector font 45, and the application proceeds to check 46, if there are more characters to be output and, if necessary, it returns to the generating 41 of the next character. For complex characters, it has been necessary in arrangements of prior art to implement several bitmap fonts in addition to the vector fonts. This emphasizes the problem of prior art even more, because the bitmap fonts or hintings defined for each character according to each size constitutes a significant load on the memory of the electronic device.

Figure 5:
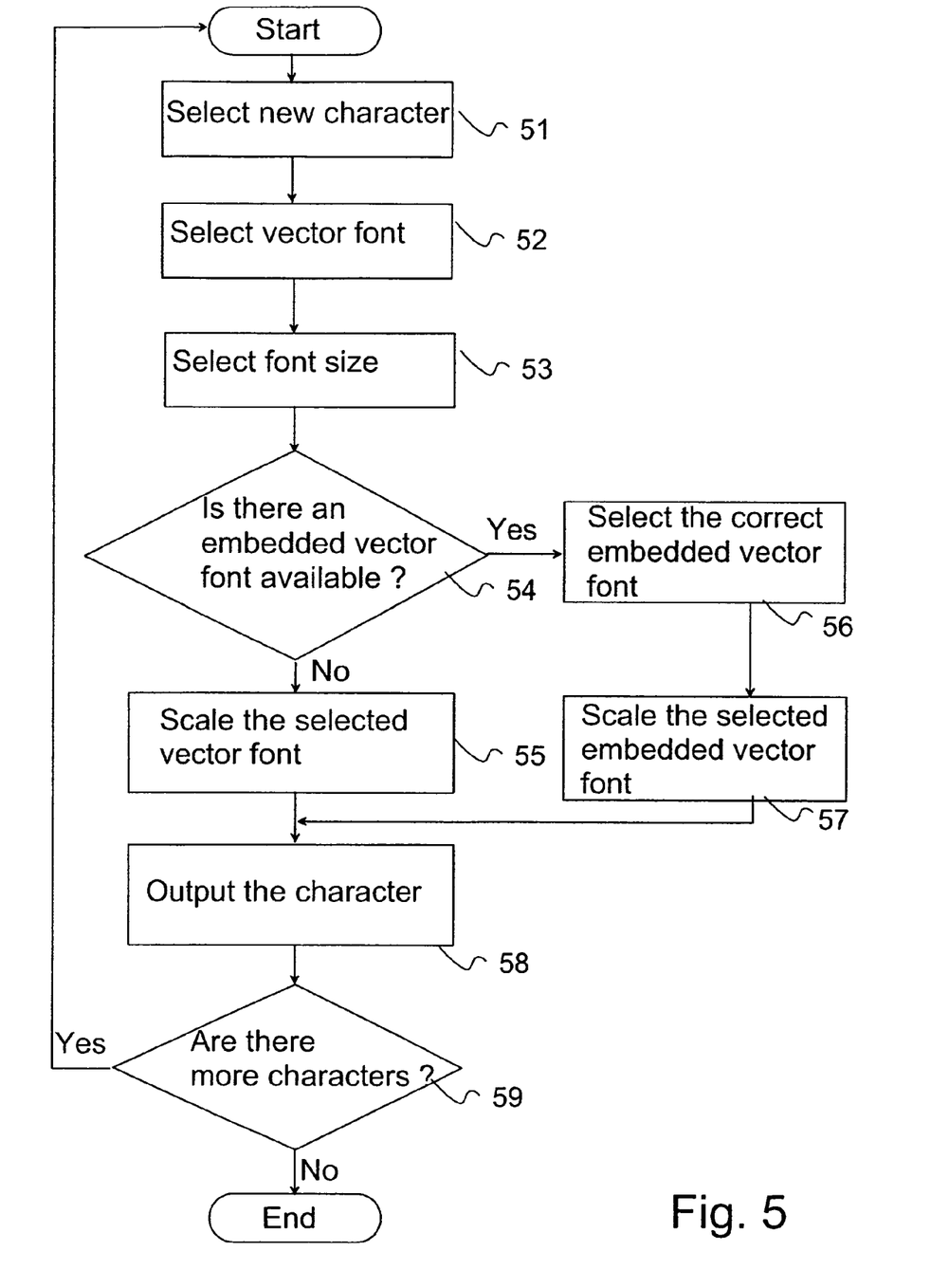
FIG. 5 shows the method according to one embodiment of the invention in a simplified flow chart.

FIG. 5 shows the method according to one embodiment of the invention in a simplified flow chart. As shown in FIG. 4, the input of the characters into the display device 1 or the printer 5 may be based on, for example, characters entered by the user via the keypad 4 of the electronic device 10, or characters generated by software being run in the electronic device 10. As shown in FIG. 5, a text processing application run in the electronic device 10 receives, as an input, a command to generate a new character 51. The new character is identified, for example, on the basis of another character system described above in this application, after which the application selects 52, on the basis of definitions provided by the user or by the application itself, for the character a scalable vector font stored in the memory means 3 of the electronic device 10. The selection of the vector font 52 is followed by the selection of the font size 53 for the character to be output.

According to one embodiment of the invention, the text processing application of the electronic device 10 checks 54, on the basis of the font size, if embedded vector fonts have been defined for the vector font in question. Particularly for stroke-based vector fonts, it is possible to create, instead of a single scalable vector font, several embedded vector fonts optimized for a given range of font sizes. The vector font optimized for a given range of font sizes makes it possible that, particularly for a stroke-based character system, the parameters needed for defining the vector font can be optimized in such a way that the readability of the stroke-based character remains better also in small font sizes. For the simplest character sets, such as the above-described Latin characters, it is possible, if desired, to use still only one scalable vector-based font, as described above. For the Chinese character set, the number of embedded vector fonts for a single font can be determined on the basis of how much memory capacity 3 of the electronic device 10 the user is willing to take up for the fonts.

At the stage of the manufacture of the device, said embedded vector fonts can be stored in the memory 3 of the electronic device 10, and/or the option can be provided to load the embedded fonts into the electronic device 10 later, for example from a server 7. The server 7 can be a system providing services in the Internet network or any device which can be used to define scalable vector fonts and transmit them to the electronic device 10. According to one embodiment of the invention, the electronic device 10 is a mobile communication device and the server 7 is a computer. Thus, by using the computer, the user can create the necessary embedded vector fonts from the original scalable vector font according to certain parameters, store them in the memory of the computer, and transmit the necessary scalable vector fonts to the mobile communication device. It is also possible that the user uses the computer to download said scalable vector fonts from a service provider and stores them in the computer which is then used as the server 7 for the mobile communication device used as the electronic device 10. According to one embodiment, it is also possible that the embedded fonts are created in the electronic device from the original scalable vector fonts according to given parameters.

According to one embodiment of the invention, three scalable embedded vector fonts for the stroke-based characters are stored in the memory means 3 of the electronic device 10. One scalable embedded vector font is optimized for small-sized fonts, for example for characters not higher than 12 pixels, the second scalable embedded vector font is optimized for medium-sized fonts, for example for fonts with a height of at least 13 pixels but not exceeding 20 pixels, and the third scalable embedded vector font is optimized for large-sized fonts, for example for fonts with a height of at least 21 pixels.

If there is an embedded vector font for said font, the correct embedded vector font is selected 56 on the basis of the determined font size. After this, the character is scaled 57 with said embedded vector font to the desired font size, and the character is output 58, for example, by a display device 1 or by a printer 5. If there is no embedded vector font for the font in question, the character is scaled 55 to the desired font size by using the selected scalable vector font, and the character is output 58. If there are more characters 59 to be presented, the process continues from the creation 51 of the next character again.

According to one embodiment of the invention, it is possible to define different numbers of embedded vector fonts for different characters within a given character set. For example in a stroke-based character system, it is possible to define only one scalable vector font for a given character and several scalable embedded vector fonts for a complex character including a lot of details.

If the different font sizes are depicted, in an application of the electronic device, in an increasing order with the definitions "Micro", "Mini", "Normal" and "Maxi", then the definition of scalable vector fonts for given characters may comply, for example, with the following table:

|         | Character A | Character B | Character C | Character D |
|---------|-------------|-------------|-------------|-------------|
| Micro   |             | X           |             | X           |
| Mini    |             |             | X           | X           |
| Normal  | X           | X           | X           | X           |
| Maxi    |             |             |             | X           |

In this example, "Character A" is simple in its structure and appearance, and it can be defined by using only one scalable vector font "Normal". "Character B", in turn, is, in this example, slightly more complex in its structure and appearance, and in very small fonts, its output as clearly as possible will require the use of the scalable vector font "Micro". The vector font "Micro" is defined to be used for characters smaller than a given font size and the vector font "Normal" for characters larger than this. "Character C" is, in this example, also slightly more complex in its structure and appearance, and in small fonts, its output as clearly as possible will require the use of the scalable vector font "Mini". The vector font "Mini" is defined to be used in a given range of font sizes, and the vector font "Normal" is defined to be used for characters outside said range of font sizes. "Character D", in turn, is, in this example, the most complex character in its structure and appearance, and its output as clearly as possible will require the use of all the four scalable embedded vector fonts "Micro", "Mini", "Normal" and "Maxi". For each vector font, a size range is defined, in which it is used. In this way, it is possible to optimize even better the consumption of the memory capacity 3 of the electronic device 10 with respect to the font descriptions of large character sets.

According to one embodiment of the invention, the text application of the electronic device 10 does not precisely know the font definitions of the device, but it suggests a given font size in addition to the character and font information to be output. In the case of the above-mentioned four vector fonts, for "character C" the application may suggest the font size "Micro", and such a scalable embedded vector font has not been defined. Thus, according to the invention, it is possible to link scalable embedded vector fonts to each other in such a way that in the absence of a specific suggested vector font, a compensatory linked vector font is selected for it. When "Mini" and "Maxi" are suggested for "Character C" and "Character B", respectively, the linked compensatory vector font could be, for example "Micro" and "Normal", respectively. By linking, it is possible to improve the modular design of the electronic device 10, in which the applications can be transferred more easily to different functional environments.

According to one embodiment of the invention, the embedded vector fonts are not directly dependent on the font size. Instead, several embedded vector fonts are defined for a given font, and the application of the electronic device 10 compares, in block 56 of FIG. 5, the readability of the characters created with the help of different embedded vector fonts, and on the basis of this, makes a decision on the selection of a given embedded vector font. According to one possible embodiment, details which are significant for the readability are defined for the characters. For example, in the case of Chinese characters, such details may be the number of parallel strokes, protruding parts on the outer edge of the character, the number of various branches, etc. At least two different characters created with an embedded vector font can be compared with each other, to select from these characters the one which comprises more details which are significant for the readability. According to another embodiment, the characters created with different embedded vector fonts can be compared, on the basis of a pattern recognition algorithm, with a character template stored in the electronic device, and the selection on the character to be presented can be made on the basis of the pattern recognition.

Figure 6:
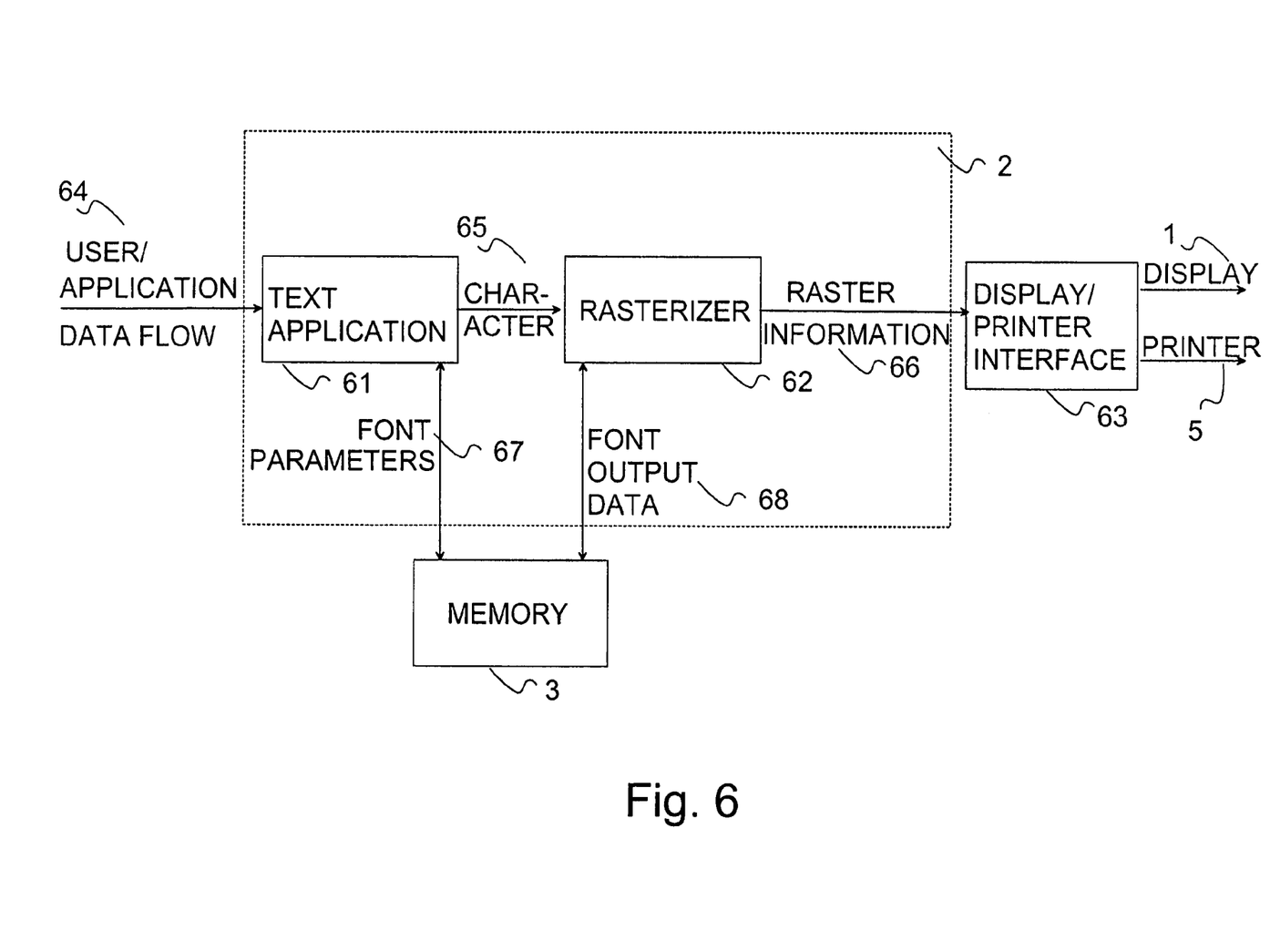
FIG. 6 shows, in a simplified block diagram, the functions of an electronic device according to one embodiment of the invention, which are essential for the invention.

FIG. 6 shows parts of the electronic device 10 which are essential for the implementation of the invention, and steps for converting characters produced by the user or by an application of the electronic device 10 for a display device 1 or a printer 5. As shown in FIG. 1, the electronic device 10 comprises a processing unit 2 which can be implemented with one or more processors, such as a microprocessor, a digital signal processing unit, etc., in a way known as such. This processing unit 2 can also be formed as a part of a so-called application specific integrated circuit (ASIC) in which also other functions of the electronic device can be implemented. For data storage, the electronic device has a memory 3, such as a read-only memory, a random access memory, and/or a non-volatile random access memory.

A text application 61 operating in the control unit 2 interprets the data flow 64 produced by the user or by an application in the device and generates, on the basis of a desired character system, single characters 65 from the input data flow. The required data of the character system, with the encoding data of the single characters, is retrieved by the text application, if necessary, from the memory means 3 of the electronic device 10. When forming the characters 65, the text application 61 typically searches the memory 3 for font parameter data 67 (FONT INFO) for initializing the font and taking it into use. A rasterizer 62 in the control unit 2, in turn, receives as its input the character to be output and data about the font type and font size to be output. The rasterizer 62 comprises the functions needed for the output of the text on a display device 1 or in a printer 5. The rasterizer 62 searches the memory means 3 of the electronic device 10 for the font data 68 (FONT DETAILS), such as the available vector fonts and the precise character-specific drawing information, and on the basis of this data, draws one character at a time. According to the invention, the rasterizer 62 selects the correct embedded vector font and then scales the font to the desired size by using said embedded vector font. After this, the rasterizer 62 transmits the raster data 66 (RASTER STREAM) of the character to be presented to the display device 1 or to the printer 5, by using a display or printer interface 63. Typically, for the interface 63, the raster data 66 transmitted by the rasterizer is converted to bitmap format.

The present invention has several advantages over the arrangements of prior art. The invention can be applied, for example, in wireless communication devices, personal digital assistants, portable computers, desktop computers and any electronic devices for presenting graphical characters to a user and for simultaneously optimizing the memory capacity taken up by the characters in relation to the readability of the characters.

In this context, the implementation and embodiments of the invention have been presented by means of examples. It will be evident to a person skilled in the art that the invention is not limited to the details of the above-presented embodiments and that the invention can also be implemented in other forms without deviating from the characteristics of the invention. Consequently, the presented embodiments should be considered as being illustrative but not restrictive. The possibilities to implement and use the invention are thus limited by the appended claims only. Thus, also various alternatives to implement the invention, as well as equivalent implementations, defined by the claims fall within the scope of the invention.

The invention claimed is:

1. A method for execution in a device for outputting a character by using a scalable vector font, comprising
creating in the device, for said scalable vector font, at least a first scalable embedded vector font and a second scalable embedded vector font, which are alternatives to each other, and
determining in the device, for a selected size for said character, if there are embedded vector fonts defined and, if not,
scaling in the device the scalable vector font to the selected size using said scalable vector font but, if so,
for optimizing in the device readability of the character, selecting one of said at least first scalable embedded vector font and second scalable embedded vector font for use in said outputting the character on an output device.

2. The method according to claim 1, comprising
defining, for said first scalable embedded vector font and second scalable embedded vector font, limits for a size range,
selecting a most suitable scalable embedded vector font as a selected scalable embedded vector font based on a desired font size, and
scaling said selected scalable embedded vector font to the desired font size.

3. The method according to claim 2, comprising:
forming the character by using the first scalable embedded vector font,
forming the character by using the second scalable embedded vector font,
defining details which are essential for the readability of the character,
comparing the characters formed by using the first scalable embedded vector font and second scalable vector font with each other,
recognizing details which are essential for the readability of the characters, and
selecting the scalable embedded vector font for said outputting the character based on a quantity of recognizable details.

4. The method according to claim 1, comprising
forming the character by using the first scalable embedded vector font,
forming the character by using the second scalable embedded vector font,
defining details which are essential for the readability of the character,
comparing the characters formed by using the first scalable embedded vector font and second scalable embedded vector font with each other,
recognizing details which are essential for the readability of the characters, and
selecting the scalable embedded vector font for said outputting the character based on a quantity of recognizable details.

5. The method according to claim 4,
comprising examining the readability of a character by examining distinguishability of strokes close to each other.

6. The method according to claim 4,
comprising defining an order of importance for strokes to be formed in the outputting of the character, and
examining the readability of the character by examining distinguishability of the strokes defined to be important.

7. The method according to claim 6,
comprising defining the order of importance based on at least one of:
a number of parallel strokes,
protruding parts at an outer edge of the character,
a number of various branches.

8. The method according to claim 4, comprising
storing character templates generated based on a pattern recognition algorithm, and
examining the readability of the character with the help of pattern recognition by comparing characters created by using different scalable embedded vector fonts, with the stored character templates.

9. The method according to claim 1, in which a character set is used which comprises at least a first character and a second character,
wherein the method comprises creating a first number of scalable embedded vector fonts and a second number of scalable embedded vector fonts for said first and second characters, respectively, the first number being different from the second number.

10. An electronic device, configured to create a first scalable embedded vector font and a second scalable embedded vector font for a character in the electronic device, which are alternatives to each other, and
to determine, for a selected size for said character, if there are embedded vector fonts available and, if not,
to scale the scalable vector font for the character but, if so,
to determine a format of the character by using the scalable vector font,
and also, for optimizing readability of the character, to select one vector font of said at least first scalable embedded vector font and said second scalable embedded vector font, for use in outputting the character.

11. The electronic device according to claim 10, also configured to define limits for a size range of said first scalable embedded vector font and second scalable embedded vector font, to select a scalable embedded vector font based on a desired font size, and to scale the selected scalable embedded vector font to the desired font size.

12. The electronic device according to claim 10, also configured
to generate the character by using the first scalable embedded vector font,
to generate the character by using the second scalable embedded vector font,
to define details which are essential for the readability of the character,
to compare the characters generated with the first scalable embedded vector font and the second scalable embedded vector font,
to identify the details which are essential for the readability of the characters formed with the first scalable embedded vector font and second scalable embedded vector font, and
to select the scalable embedded vector font to be used, based on a number of details identified.

13. A memory having software comprising machine-executable program instructions stored thereon for controlling functions of an electronic device by:
determining, for a selected size for said character, if there are embedded vector fonts defined, and, if not,
scaling the scalable vector font to the selected size using said scalable vector font but, if so,
selecting, according to said size, an embedded vector font from among said embedded vector fonts,
scaling a selected embedded vector font, and providing the character for said output scaled according to either the scalable vector font or the selected embedded vector font.

14. A system comprising:
a server,
at least one electronic device,
said system configured
to provide a data transmission connection between the electronic device and the server,
to create a first scalable embedded vector font and a second scalable embedded vector font, which are alternative to each other,
to determine, for a selected size for a character, if there are embedded vector fonts available and, if not,
to scale a scalable vector font for the character but, if so,
to transmit said alternative first scalable embedded vector font and said second scalable embedded vector font from the server to the electronic device, and
to select one embedded vector font from said at least the first scalable embedded vector font and said second scalable embedded vector font for the output of the character for optimizing readability of the character.

15. A method for execution in a device for output of a character by using a scalable vector font,
comprising
determining in the device, for a selected size for said character, if there are embedded vector fonts defined, and, if not,
scaling in the device the scalable vector font to the selected size using said scalable vector font but, if so,
selecting in the device, according to said size, an embedded vector font from among said embedded vector fonts,
scaling in the device a selected embedded vector font, and
providing in the device the character for said output scaled according to either the scalable vector font or the selected embedded vector font for display on an output device.

16. The method according to claim 15, wherein said embedded vector fonts vary in number by character according to character complexity, that is, a larger number for complex characters than for simpler characters to optimize memory consumption and readability of characters.

17. A device for output of a character by using a scalable vector font,
said device configured
to determine, for a selected size for said character, if there are embedded vector fonts available and, if not,
to scale the scalable vector font for the character but, if so,
to select, according to said size, an embedded vector font from among said embedded vector fonts,
to scale a selected embedded vector font for the character, and
to provide the character for said output scaled according to either the scalable vector font or the selected embedded vector font.

18. The device according to claim 17, wherein said embedded vector fonts vary in number by character according to character complexity, that is, a larger number for complex characters than for simpler characters to optimize memory consumption and readability of characters.

* * * * *

UNITED STATES PATENT AND TRADEMARK OFFICE
CERTIFICATE OF CORRECTION

PATENT NO.       : 7,609,268 B2                                    Page 1 of 1
APPLICATION NO.  : 11/027028
DATED            : October 27, 2009
INVENTOR(S)      : Atte Kotiranta It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 317 days.

Signed and Sealed this

Fourteenth Day of December, 2010

David J. Kappos
*Director of the United States Patent and Trademark Office*